United States Patent
John et al.

(10) Patent No.: US 12,258,746 B2
(45) Date of Patent: Mar. 25, 2025

(54) ELECTRO PNEUMATIC AND ELECTROMECHANICAL ACTUATED DIAPHRAGM TYPE FLUSH VALVE FOR AIRCRAFT TOILET

(71) Applicant: B/E Aerospace, Inc., Winston Salem, NC (US)

(72) Inventors: Poly John, Cochin (IN); Gururaja Bambila, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 152 days.

(21) Appl. No.: 18/114,058

(22) Filed: Feb. 24, 2023

(65) Prior Publication Data
US 2024/0183140 A1   Jun. 6, 2024

(30) Foreign Application Priority Data
Dec. 5, 2022   (IN) .............................. 202241070157

(51) Int. Cl.
*E03D 5/10* (2006.01)
*B64D 11/02* (2006.01)
*E03D 3/06* (2006.01)

(52) U.S. Cl.
CPC ................ *E03D 5/10* (2013.01); *B64D 11/02* (2013.01); *E03D 3/06* (2013.01)

(58) Field of Classification Search
CPC ... E03D 5/10; E03D 3/06; B64D 11/02; E03F 1/00; E03F 5/02; E03F 5/10; F16K 31/04; F16K 31/143
USPC ..................................................... 4/238, 368
See application file for complete search history.

(56) References Cited

U.S. PATENT DOCUMENTS

| | | |
|---|---|---|
| 3,907,248 A | 9/1975 | Coulbeck |
| 4,275,470 A | 6/1981 | Badger et al. |
| 4,521,925 A | 6/1985 | Chen et al. |
| 4,832,310 A | 5/1989 | Nestich |
| 5,044,836 A | 9/1991 | Grooms |
| 6,349,921 B1 | 2/2002 | Jahrling |
| 6,929,238 B2 * | 8/2005 | Bartell, Jr. ............ F16K 15/063 251/83 |
| 8,595,868 B2 | 12/2013 | Fukagawa et al. |
| 10,767,356 B2 | 9/2020 | Maercovich |

(Continued)

FOREIGN PATENT DOCUMENTS

| | | | |
|---|---|---|---|
| EP | 3122951 | 5/2018 | |
| EP | 4382685 A1 * | 6/2024 | ............ B64D 11/02 |

OTHER PUBLICATIONS

European Patent Office, European Search Report dated May 3, 2024 in Application No. 23214113.5.

*Primary Examiner* — Lori L Baker
(74) *Attorney, Agent, or Firm* — SNELL & WILMER L.L.P.

(57) ABSTRACT

A flush valve includes a housing having a first end and a second end, a piston stem extending between the first end and the second end, a piston stem fore end coupled to the piston stem, a first O-ring and a second O-ring defining a control chamber therebetween, and a solenoid valve in fluid communication with the control chamber. The piston stem fore end is positioned toward the second end when in a closed position. In an energized state, the solenoid valve charges a pressurized gas into the control chamber, pushing the piston stem toward the first end and into an open position.

19 Claims, 6 Drawing Sheets

(56) References Cited

U.S. PATENT DOCUMENTS

| | | |
|---|---|---|
| 2020/0115889 A1* | 4/2020 | Kuru .......................... E03D 3/10 |
| 2024/0309626 A1* | 9/2024 | Sherwood ................. E03F 5/10 |
| 2024/0309627 A1* | 9/2024 | Sherwood ................. E03F 5/10 |
| 2024/0318739 A1* | 9/2024 | Yoshida ................. F16K 31/04 |

* cited by examiner

ELECTRO PNEUMATIC AND ELECTROMECHANICAL ACTUATED DIAPHRAGM TYPE FLUSH VALVE FOR AIRCRAFT TOILET

CROSS-REFERENCE TO RELATED APPLICATIONS

This application claims priority to, and the benefit of, India Patent Application No. 202241070157 (DAS CODE: BD79), filed Dec. 5, 2022, and titled "ELECTRO PNEUMATIC AND ELECTROMECHANICAL ACTUATED DIAPHRAGM TYPE FLUSH VALVE FOR AIRCRAFT TOILET," which is incorporated by reference herein in its entirety for all purposes.

FIELD

The present disclosure relates to aircraft lavatory systems and methods and, more particularly, valve assemblies for vacuum-driven systems used in aircraft lavatories.

BACKGROUND

Aircraft cabins include lavatories having vacuum-driven systems. The waste removing process in such a system may be based primarily on differences between ambient pressure and a generated vacuum. The vacuum toilet flush valves in various lavatories have in-service performance issues. For instance, an electric motor operated disc valve to open and close the drain path from the bowl base to waste collection tank may be used. This disc rotation interface with seal ring during each operating cycle and rotation is prone to have obstruction with interfering of hard particles from the waste. The repeated sliding movement of this gate design during the in-service usage also may cause deterioration of the sealing face which eventually results in the fluid leakage. Across different platforms, considerable in-service performance issues such as the leakage and the clogging with obstructing the gate movement etc. have been reported for this flush valve type designs.

SUMMARY

A flush valve includes a housing having a first end and a second end, a piston stem extending between the first end and the second end, a piston stem fore end coupled to the piston stem, a first O-ring and a second O-ring defining a control chamber therebetween, and a solenoid valve in fluid communication with the control chamber. The piston stem fore end is positioned toward the second end when in a closed position. In an energized state, the solenoid valve charges a pressurized gas into the control chamber, pushing the piston stem toward the first end and into an open position.

In various embodiments, in the closed position, the piston stem fore end is configured to interface with a shaped seating region provided in a drainpipe.

In various embodiments, the flush valve further includes a biasing member configured to spring load the piston stem.

In various embodiments, the flush valve further includes a diaphragm coupled to the piston stem fore end.

In various embodiments, the diaphragm is a circular shaped flexible elastomeric diaphragm such that in the open position, the diaphragm is deflected by the piston stem movement away from the second end.

In various embodiments, the flush valve further includes a manual override unit coupled to the piston stem.

In various embodiments, the manual override unit includes a leverage unit coupled to a fulcrum fixed to the housing, the leverage unit loaded with a torsion spring to provide a tension.

A plumbing system includes a toilet bowl, a rinse valve coupled to the toilet bowl and configured to open in response to external activation, a vacuum generator configured to create a differential pressure in the plumbing system to move waste from the toilet bowl to a waste tank, and a flush valve coupled to the toilet bowl and configured to open in response to the external activation. The flush valve includes a housing having a first end and a second end, a piston stem extending between the first end and the second end, a piston stem fore end coupled to the piston stem, a first O-ring and a second O-ring defining a control chamber therebetween, and a solenoid valve in fluid communication with the control chamber. The piston stem fore end is positioned toward the second end when in a closed position. In an energized state, the solenoid valve charges a pressurized gas into the control chamber, pushing the piston stem toward the first end and into an open position In various embodiments, in the closed position, the piston stem fore end is configured to interface with a shaped seating region provided in a drainpipe.

In various embodiments, in response to opening the rinse valve, waste water may flow via fluid conduits from a potable water tank to the toilet bowl and waste water is dispensed via the drainpipe from the toilet bowl to the waste tank, such that the flush valve facilitates the waste water to move through the drainpipe in the open position.

In various embodiments, in the closed position, the piston stem fore end is configured to interface with a shaped seating region provided in a drainpipe.

In various embodiments, the plumbing system further includes a biasing member configured to spring load the piston stem.

In various embodiments, the plumbing system further includes a diaphragm coupled to the piston stem fore end.

In various embodiments, the diaphragm is a circular shaped flexible elastomeric diaphragm such that in the open position, the diaphragm is deflected by the piston stem movement away from the drainpipe.

In various embodiments, the plumbing system further includes a manual override unit coupled to the piston stem.

In various embodiments, the manual override unit comprises a leverage unit coupled to a fulcrum fixed to the housing, the leverage unit loaded with a torsion spring to provide a tension.

A flush valve includes a housing having a first end and a second end, a piston stem extending between the first end and the second end, and a piston stem fore end coupled to the piston stem. The piston stem fore end is positioned toward the second end when in a closed position. The flush valve includes a motor in mechanical communication with the piston stem such that the motor is configured to move the piston stem toward the first end and into an open position.

In various embodiments, the piston stem comprises a rack.

In various embodiments, the flush valve further includes a pinion coupled to the motor. The pinion is configured to mate with the rack such that the motor is configured to transfer a rotary movement to a linear type via the pinion.

In various embodiments, the flush valve further includes a biasing member configured to spring load the piston stem. The flush valve further includes a diaphragm coupled to the piston stem fore end, wherein the diaphragm is a circular shaped flexible elastomeric diaphragm such that in the open position, the diaphragm is deflected by the piston stem movement away from a drainpipe. The flush valve further includes a manual override unit coupled to the piston stem, wherein the manual override unit comprises a leverage unit coupled to a fulcrum fixed to the housing, the leverage unit loaded with a torsion spring to provide a tension.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Aircrafts use vacuum toilets with a flush valve for the opening and closing of the drain connecting the toilet bowl to a waste holding tank, maintained at a partial vacuum. Flush valves open to remove the waste from the toilet bowl to an underfloor waste holding tank. At high altitude, the differential pressure between the cabin and the atmospheres is sufficient to move the waste from the toilet bowl into the waste holding tank. At low altitude or on the ground, a vacuum generator starts to produce differential pressure in the waste system to move the waste from the bowl to the tank. The vacuum system controller controls the flushing system operations. These vacuum toilets use very little water and can flush in any direction. During use of a vacuum flush system, it is desirable to keep the drain connecting the toilet bowl to the waste holding tank in the closed position, except for a relatively brief period when the toilet is engaged in a waste flushing cycle. If the vacuum to the bowl is not obstructed when the toilet is not in a flushing cycle, the cabin of the aircraft where the bowl is situated eventually would suffer an unacceptable reduction in cabin pressure. The drain should be closed at the ground level to prevent the migration of the undesirable waste fumes from the waste holding tank to the cabin.

Several flush valves have been developed for the opening and closing of the drain in vacuum flush systems. Such flush valves may be prone to have obstruction with interfering of hard particles from the waste and/or the in-service usage may cause deterioration of a sealing face which eventually results in the fluid leakage. Accordingly, the flush valve described herein reduces or eliminates the sliding movements of valve internal parts within the drain path, thus eliminating operational issues as in other current designs. For instance, the flush valve uses the deflection of an elastomeric flexible diaphragm to open and close the drain path. In various embodiments described herein, this deflection is controlled using electro pneumatic actuation using a three-way on/off solenoid valve operated piston. The pneumatic medium is the cabin air, pressurized using compressor and storage bottle. The diaphragm may be bonded with an actuator piston stem. In various embodiments described herein, the deflection is controlled using a DC motor with a pinon-rack arrangement. The diaphragm may be bonded with an actuator stem integrated with a rack. This actuator stem may additionally be actuated by a manual pull actuation.

Variants of locations, sizes, shapes, geometries, materials, connections, methods of making, etc. of such added parts can be designed according to specifics of considered aircraft and its lavatory system. Also, more than one added part can also be used if needed. Further, while described herein in the context of an aircraft, the disclosed lavatory system may be implemented in non-aircraft applications (e.g., trains, submarines, high-level floors in skyscraper buildings or towers, buildings in dry desert areas, etc., i.e., in cases with limited water supply).

Figure 1:
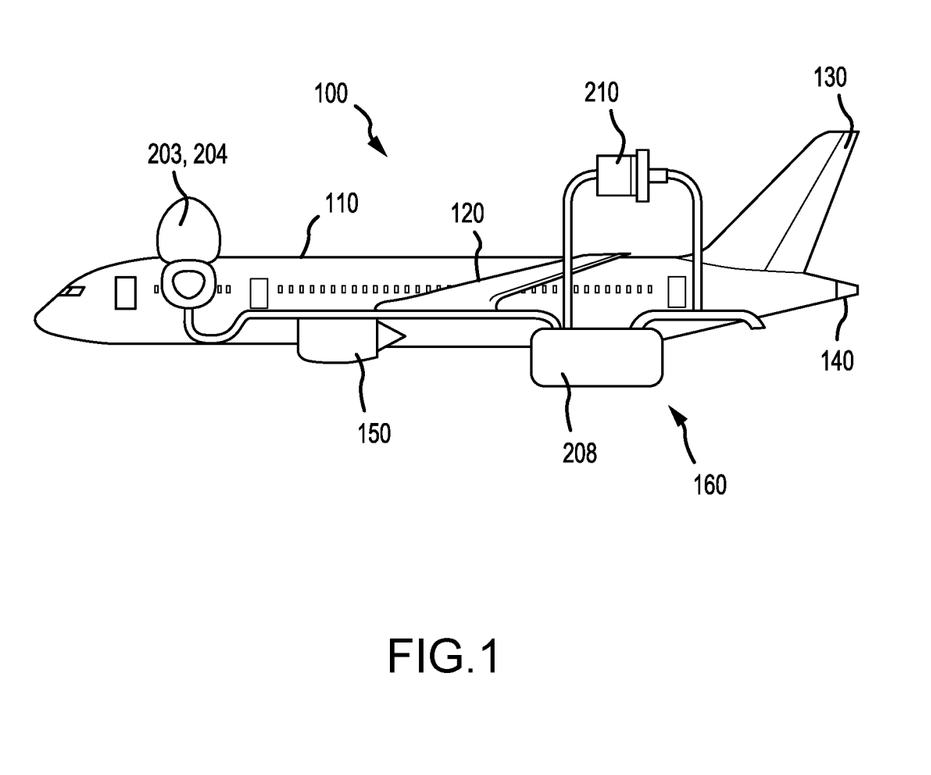
FIG. 1 illustrates an aircraft, in accordance with various embodiments.

Referring now to FIG. 1, a side view of an aircraft 100 is illustrated in accordance with various embodiments. The aircraft 100 comprises a fuselage 110, wings 120 extending outward from the fuselage 110, a vertical stabilizer 130, horizontal stabilizers 140 and engines 150. In various embodiments, fuselage 110 defines an aircraft cabin therein. In this regard, passengers may board the aircraft 100 and sit within the aircraft cabin during travels. The aircraft cabin includes at least one lavatory disposed therein. Aircraft 100 may have a potable water and wastewater system 160. As described in further detail below, an aircraft lavatory system 200 may be employed with one or more components of the potable water and wastewater system 160. Certain features, such as potable water and wastewater system 160, aircraft lavatory system 200, toilet bowls 203, 204, and other are illustrated on the exterior of aircraft 100 for illustrative purposes.

Figure 2:
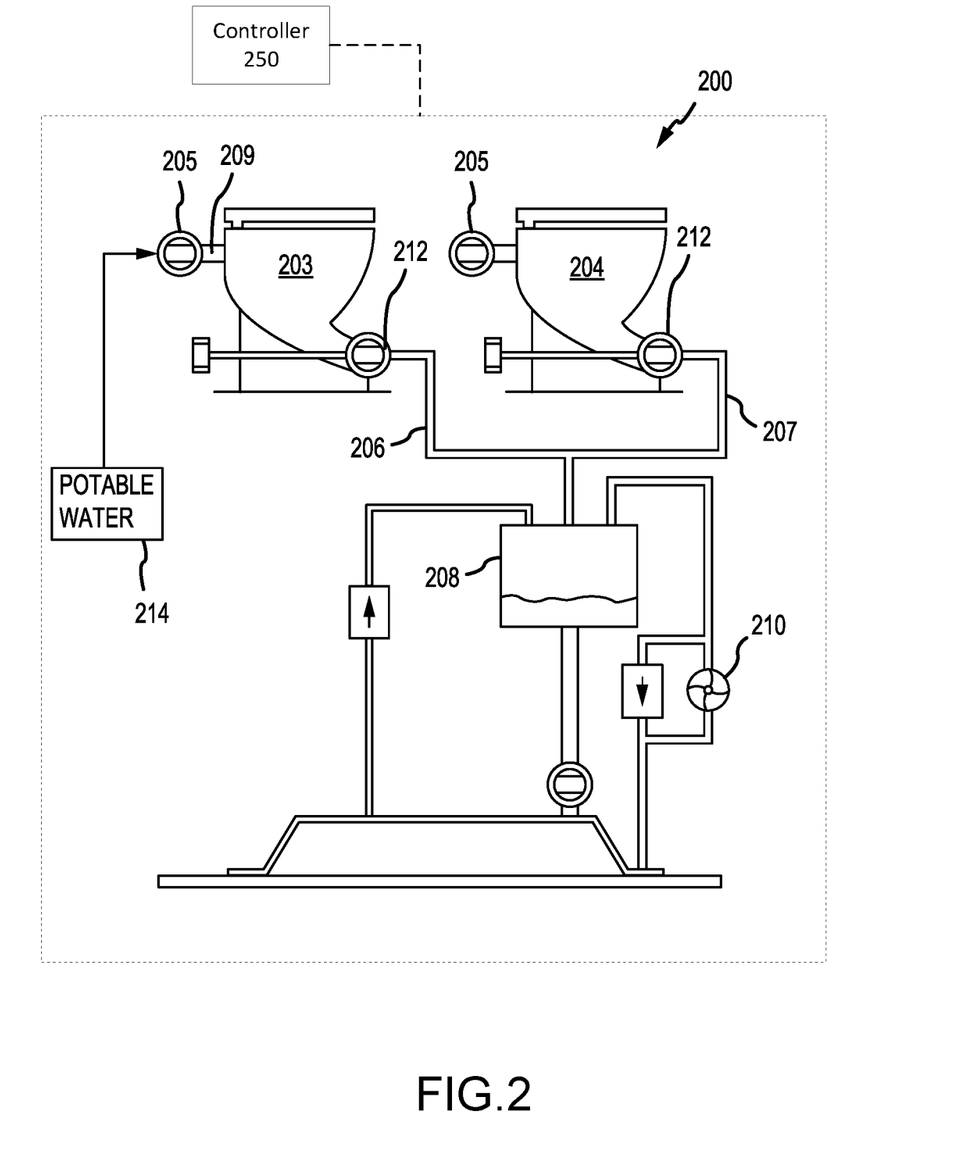
FIG. 2 illustrates a plumbing system of an aircraft, in accordance with various embodiments.

Referring now to FIGS. 1-2, a plumbing system 200 is illustrated, in accordance with various embodiments. In various embodiments, the plumbing system 200 comprises a rinse valve 205 associated with each toilet bowl (e.g., toilet bowls 203, 204). The rinse valve 205 is configured to open in response to external activation (e.g., via flushing of a handle, via a sensor detecting a person is no longer in front of the sensor, or the like). In response to opening the rinse valve 205, waste water (e.g., potable water) may flow (e.g., via fluid conduits 209) from a potable water tank 214 to a toilet bowl 203 or toilet bowl 204. In various embodiments, during the flushing process, flush valves 212 are opened and waste water may be dispensed through a fluid conduits 206, 207 from each toilet bowl (e.g., toilet bowls 203, 204) to the waste tank 208. In this regard, any solid waste may be transported from the toilet bowl (e.g., toilet bowl 203 or toilet bowl 204) to the waste tank 208 as waste water, in accordance with various embodiments. The plumbing system 200 may further include a vacuum generator 210. The vacuum generator 210 may include an actuator, motor, or other device or component which initiates a vacuum flush of a toilet within the laboratory. The vacuum generator 210 may be controlled to initiate or cease a flush operation.

In various embodiments the plumbing system 200 is in electronic (i.e., electrical or wireless) communication with a controller 250. In various embodiments, controller 250 may be integrated into computer system of the aircraft. In various embodiments, controller 250 may be configured as a central network element or hub to access various systems and components of the plumbing system 200. Controller 250 may comprise a network, computer-based system, and/or software components configured to provide an access point to various systems and components of the plumbing system 200. In various embodiments, controller 250 may comprise a processor. In various embodiments, controller 250 may be implemented in a single processor. In various embodiments, controller 250 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 250 may comprise a processor configured to implement various logical operations in response to execution of instructions, for example, instructions stored on a non-transitory, tangible, computer-readable medium configured to communicate with controller 250.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
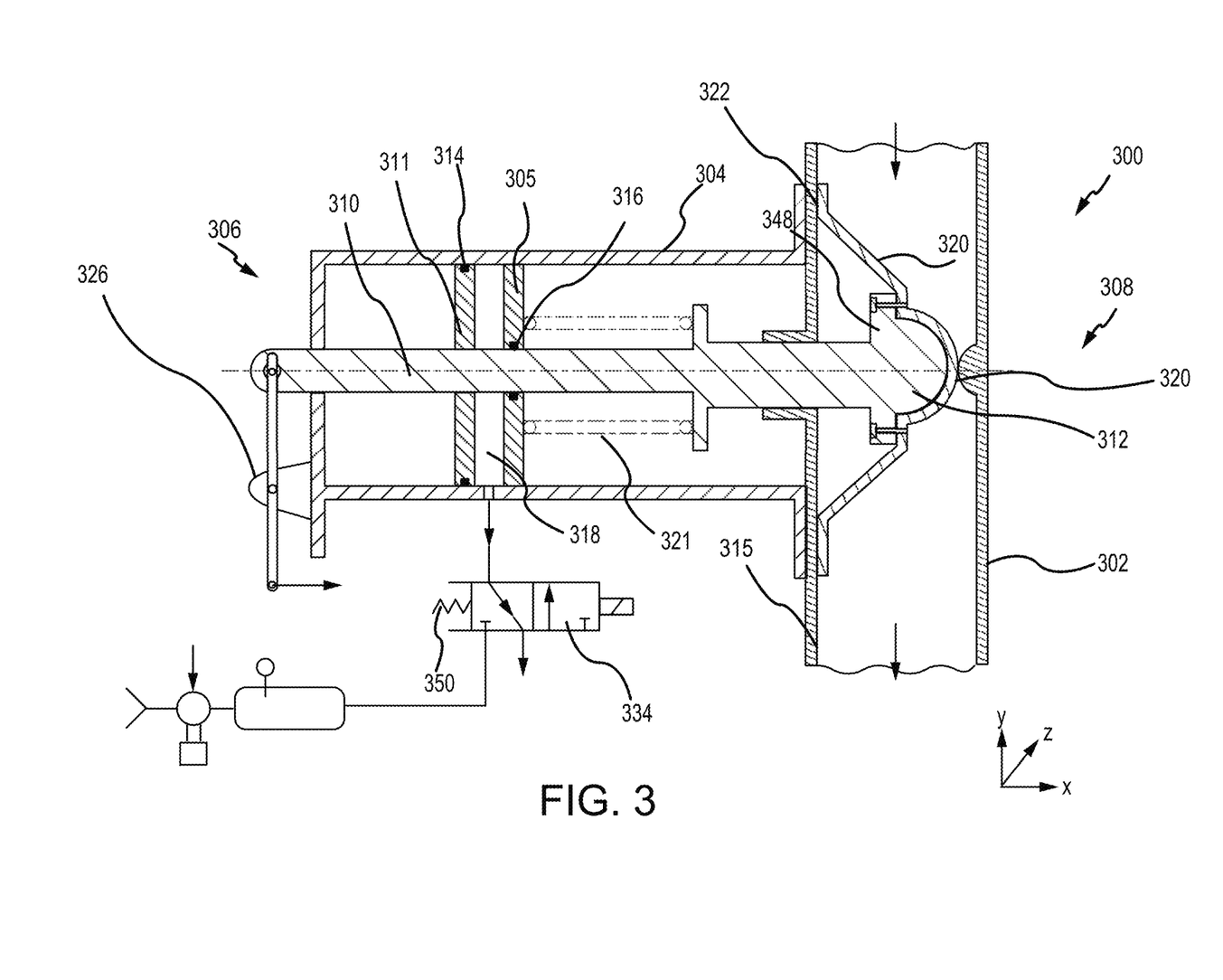
FIG. 3 illustrates a schematic cross-sectional view of a flush valve in a closed position, in accordance with various embodiments.

Referring now to FIG. 3, a flush valve 300 (e.g., flush valve 212) is illustrated. A drainpipe 302 (e.g., fluid conduits 206, 207) is extended from the toilet bowl (e.g., toilet bowls 203, 204) base region and linked to the waste tank 208. A portion of the drainpipe 302 as shown may be a vertical (e.g., extending along a y-axis) straight section, however the drainpipe 302 may be designed with any suitable geometry schematic. The flush valve 300 may be defined by a housing 304 having a first end 306 and a second end 308 opposite the first end along a longitudinal axis (e.g., along an x-axis). The housing 304 may be cylindrical and is configured to house a piston stem 310. The piston stem 310 may extended along the longitudinal axis. The housing 304 may include a guide step 305. The guide step 305 may be configured to extend from the housing 304. For instance, the guide step 305 may extend radially inward (e.g., perpendicularly) from the housing 304 to the piston stem 310. The guide step 305 may be configured to prevent lateral movement of a biasing member, as explained further herein.

The piston stem 310 may include a piston arm 311. The piston arm 311 may be configured to extend from the piston stem 310. For instance, the piston arm 311 may extend radially outward (e.g., perpendicularly) from the piston stem 310 to the housing 304. The piston stem 310 may be configured to slide along the longitudinal axis with bi-directional movement. Accordingly, the piston arm 311 may be configured to slide along the longitudinal axis, corresponding with the movement of the piston stem 310. The piston stem 310 includes a piston stem fore end 312. In a closed position, as shown in FIG. 3, the piston stem fore end 312 may be positioned toward the second end 308 of the housing 304. For instance, the piston stem fore end 312 may extend beyond a housing plate 315 on the second end 308 of the housing 304 and into the drainpipe 302. The piston stem fore end 312 may be hemispherically shaped.

The first and second O-ring seals 314, 316 form a gap between the first and second O-ring seals 314, 316, defining a control chamber 318. Inside the housing 304, the control chamber 318 is provided with a feed hole for the pneumatic charging and discharging of the control chamber 318.

The flush valve 300 includes a first O-ring seal 314 and a second O-ring seal 316. The first O-ring seal 314 may be coupled to the piston arm 311. For instance, the first O-ring seal 314 may be positioned between the piston arm 311 and the housing 304, thus forming a seal within the housing 304. The second O-ring seal 316 may be coupled to the guide step 305. For instance, the second O-ring seal 316 may be positioned between the guide step 305 and the piston stem 310, thus forming a seal within the housing 304.

The flush valve 300 further includes a diaphragm 320. The diaphragm 320 may be a circular shaped flexible elastomeric diaphragm. The diaphragm 320 may be coupled to the piston stem fore end 312. For instance, in the closed position, the diaphragm 320 is nearly conical shaped, and an outer edge 322 is coupled to the housing 304. The diaphragm 320 may be coupled via joints and/or using clamping screws and adhesive bonding. Accordingly, diaphragm deflection to a valve open position is induced by the piston stem 310 movement away from the drainpipe 302 along the longitudinal axis. The diaphragm 320 may be made from any suitable compliance material, for instance a silicone with suitable filler materials (e.g., carbon), a Polytetrafluoroethylene (PTFE), etc. to meet the environmental requirements. The piston stem 310 may be made of polymeric materials such as thermoplastic or and/or thermoset materials and/or low-density metallic materials such as aluminum alloys.

In the valve closed position, the piston stem 310 bonded to the diaphragm 320 is spring loaded via a biasing member 321 (e.g., a spring) against the guide step 305, and the diaphragm 320 is forced to interface with a shaped seating region 324 provided in the drainpipe 302. The shaped seating region 324 is suitably designed and assembled to form such a diaphragm valve. For instance, the diaphragm 320 may be assembled inside a shaped valve housing with the clamping and the interface seating region. This valve assembly may be fitted in the drain path connecting the bowl base to the waste collection tank.

In the valve closed position, the bowl waste occupies the internal cavity space bounded by the diaphragm frontal face. By this, waste fluid in the bowl does not leak flow to the downstream side of the diaphragm valve. The diaphragm 320 in this assembled condition is designed with enough structural strength to support the weight of the specified waste getting deposited in the bowl.

Figure 4:
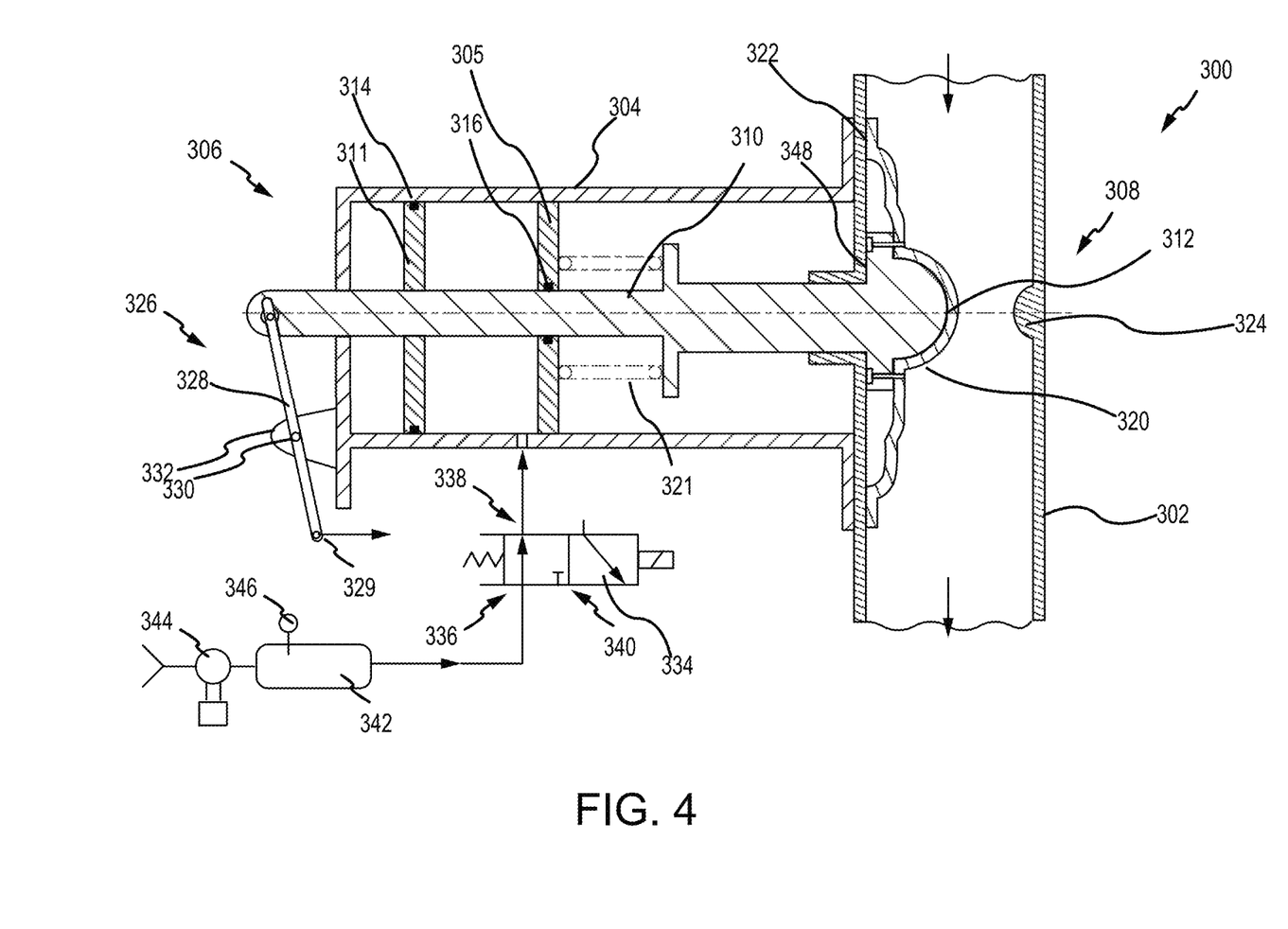
FIG. 4 illustrates a schematic cross-sectional view of the flush valve of FIG. 3 in an open position, in accordance with various embodiments.

The piston stem 310 is further extended to the first end 306 and extended from the housing 304. This extended region is provided with a manual override unit 326. Referring briefly to FIG. 4, the manual override unit 326 includes a leverage unit 328 attached to a fulcrum 330 fixed with the housing 304. This leverage unit 328 may be loaded with torsion spring 332 to provide tension to resist the vibration and the abusive loads.

Referring now to FIGS. 3-4, the control chamber 318 is linked to an outlet port of a three-way solenoid valve 334. The solenoid valve has an inlet 336, an outlet 338, and vent ports 340. The solenoid vent port 340 is left open to the lavatory environment. As shown, the inlet 336 of the three-way solenoid valve 334 is linked to a storage cylinder 342 filled with pressurized gas. The cabin air available may be utilized for this purpose. The cabin air may be pressurized and stored in the storage bottle using a compressor 344. The air filling in the pressurized manner is conducted based on the storage pressure, which is monitored using a pressure gauge 346 attached to the storage bottle.

This pressurized pneumatic source may be made common to operate similar electropneumatic flush valves used in other nearby vacuum toilets of the same aircrafts. As the solenoid valve 334 is energized the solenoid valve 334 gets opened, and the pressurized gas is charged into the control chamber 318. The net pressure force is decided via the controller 250 by the difference of the net pressure force acting at the first and second O-ring seals 314, 316 respectively. Since the first O-ring seal 314 size may be greater than the second O-ring seal 316, the net pressure force pushes the piston away from the drainpipe 302. This way, the pneumatic actuation force in the valve opening direction dominates over the spring force providing the valve closing force. By this, the piston stem 310 moves toward the first end 306 which deflects the diaphragm 320 away from the seated region. FIG. 4 illustrates the flush valve 300 in the opened condition.

Referring now to FIG. 4, the opening movement is limited by the stopping of a shoulder region 348 of the piston stem fore end 312 with the housing plate 315 which support to retain the diaphragm 320. The piston movement this way deflects the flexible diaphragm 320 as shown and the drain path gets opened. The biasing member 321 gets more deflection and the effective loading increases. This increased spring loading is not reflected on the diaphragm 320 as the pneumatic actuation force is retained for the valve opened position. As the piston stem 310 moves to open the flush valve 300, the leverage unit 328 of the manual override unit 326 gets more deflected, as shown in FIG. 4.

Typically, this flush valve opening is limited for short durations of 4-seconds. The solenoid valve 334 may be kept energized for this duration. After the duration of flushing time, the solenoid valve 334 may be deenergized. In this state, the pneumatic medium filled in the control chamber 318 gets vented out through the vent port 340 attached to the three-way solenoid valve 334. This way, the pneumatic actuation force decreases, and the spring force gets dominated. Eventually, the spring force pushes the piston to forward, and the stem fore end deflects the diaphragm back to the valve closed state.

The diaphragm deflections between the flush valve opening and closing is controlled by the opening and closing of the solenoid valve 334. For instance, the solenoid valve 334 may be in fluid communication with a source of pressurized gas. The solenoid valve 334 may control a flow of pressurized gas from the source of pressurized gas and may operate to place the solenoid valve inlet 336 and outlet 338 in fluid communication with each other. In the energized state, the solenoid valve inlet 336 and outlet 338 ports are connected. The outlet 338 and vent ports 340 get disconnected. For instance, in various embodiments, as the solenoid valve inlet 336 receives the pressurized fluid (e.g., from compressed fluid source), the pressurized fluid flows through the outlet 338 to the control cavity 318. In the energized position, a pressure force may be exerted on an actuator axially toward the vent port 340. In this regard, the pressure force may provide an additional sealing force for the vent port 340. In the solenoid de-energized state, the solenoid valve inlet 336 and outlet 338 ports are disconnected, and the outlet 338 and the vent ports 340 are connected thus configured to vent the pressurized fluid from the control cavity 318. If electric power is not available, the manual override unit 326 coupled to the piston stem 310 may be utilized to open the flush valve 300. For instance, as shown in FIG. 3, the leverage unit 328 is provided with a pull cable 329. This pull cable 329 may be triggered manually to pull the piston against the spring force. This action in turn deflects the diaphragm 320 to open the flush valve. The fulcrum leverage arrangement reduces the manual force required to pull the piston against the spring force.

Beneficially, in various embodiments, this diaphragm type flush valve operates on the principle of deflection of a flexible elastomeric diaphragm. In the valve closed position, the sealing load is provided by a compression spring 350. This deflection is controlled by the opening and closing of the three-way solenoid valve 334. The solenoid on/off operation charge and discharge the air extracted from the cabin using compressor 344 and storage tank 342. The pressurized cabin air source may be made common to operate multiple flush valves of this types. The flush valve 300 opening increases the loading spring 321; however, this does not reflect at the diaphragm 320. In various embodiments, the diaphragm 32-benefits from a design for the initial waste holding strength with interfacing with seating region to achieve the initial leak tightness. This electro pneumatic actuator (e.g., the piston stem 502 and motor 506) is kept entirely outside the drain path. The on/off solenoid is a reliable device and the pneumatic medium used is cabin air only. The manual override feature (e.g., the manual override unit 326) is also a simplified unit. The diaphragm 320 and solenoid valves 334 are physically delinked, and maintenance is very much simplified. Since the flushing process is vacuum assisted, the diaphragm 320 interfacing with the seating 324 for successive flush valve closing becomes resistant to clogging and contamination. This way, valve sealing cleanliness and the sealing performance is not degraded and reliable compared to the current design. Accordingly, the flush valve 300 inherently involves modular type arrangement of components, and simplifies the overall realization and the maintenance process.

Figure 5:
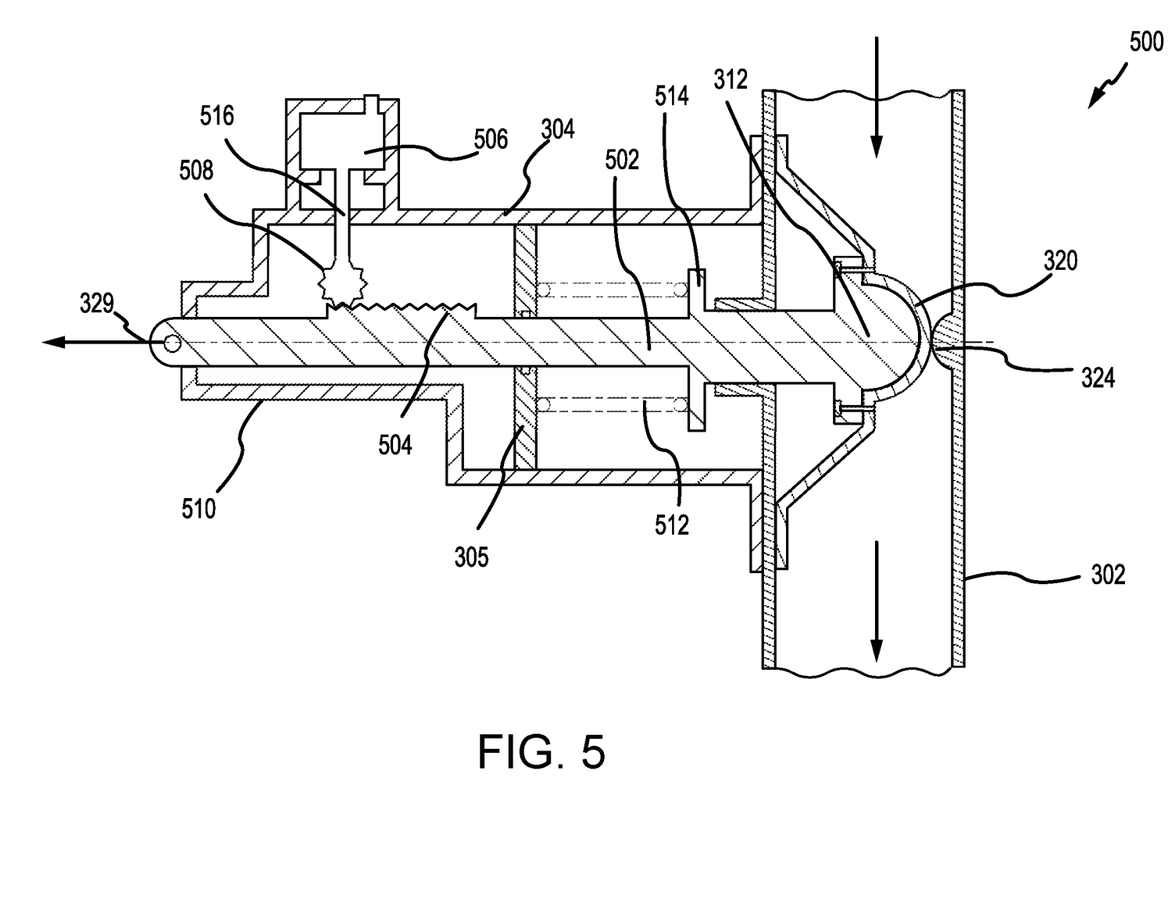
FIG. 5 illustrates a schematic cross-sectional view of a flush valve in a closed position, in accordance with various embodiments.

Referring now to FIG. 5, a flush valve 500 is illustrated according to various embodiments. The flush valve 500 includes like components to flush valve 300 as shown with like reference numbers. A piston stem 502 (e.g., piston stem 310) includes a rack 504 integral to the piston stem 502. The flush valve 500 includes an electric motor 506 with a pinion 508 configured to transfer the motor rotary movement to linear type. The piston stem 502 may be made from low density metallic materials conducive for making the desired rack profile.

A housing 510 is provided with inner steps to guide the linear movement of the piston stem 502. This is defined with cavity spacings for the rack 504 and a biasing member 512 (e.g., a compression spring). In various embodiments, one compression spring 512 is provided, and loaded to a collar 514 provided in the piston stem 502. Accordingly, the stem fore end 312 coupled to the piston stem 502 and bonded with the diaphragm 320 is spring loaded to interface with a seating region provided in the drainpipe 302.

The electric motor 506 may be a brushed DC motor or brushless DC type motor (BLDC), for instance. Construction of the motor may differ accordingly. A motor output shaft 516 may be provided with a pinion gear to interface with the linear gear or the rack 504 provided in the piston stem 502. Accordingly, the motor rotary motion is transformed to the linear one and the unit performs as a simple linear actuator. The motor resistance torque may be estimated based on the diaphragm valve sealing force which is provided by the spring force. This resistance torques is influenced by the valve closing force, stiffness and friction force of the stem slide movement. This, along with inertia torque finally determine the motor output torque associated with the motor output shaft 516.

Figure 6:
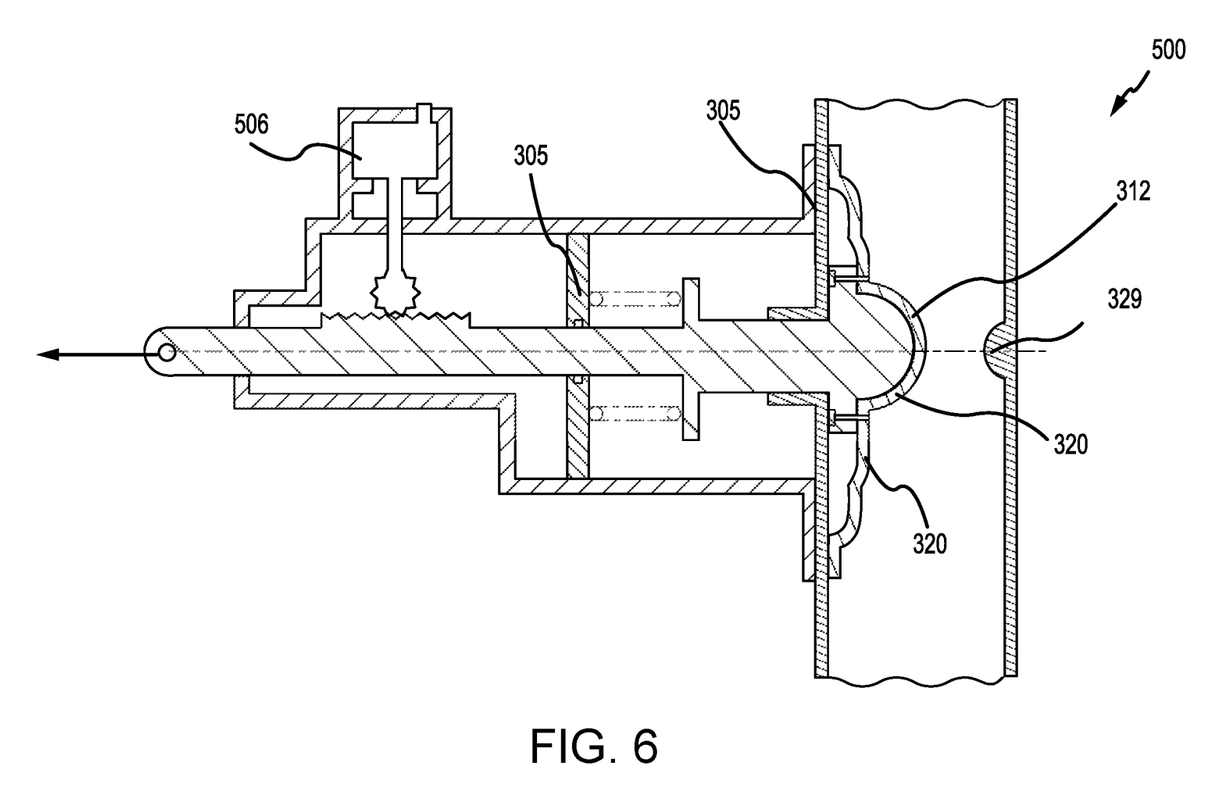
FIG. 6 illustrates a schematic cross-sectional view of the flush valve of FIG. 5 in an open position, in accordance with various embodiments.

As the motor 506 is electrically energized, it rotates the pinion 508 which in turn induce linear movement to the rack 504 of the piston stem 502. Accordingly, the piston stem 502 moves toward the first end 306 which deflects the diaphragm 320 away from the seated region. FIG. 6 illustrates the flush valve 500 in the opened condition. If the electric power is not available, the manual pull cable 329 coupled to the piston stem 502 may be pulled to open the flush valve 500. This pulling action moves the piston stem 502 to open the flush valve 500. If required, the manual effort in pulling the cable 329 may be reduced by providing suitable leverage mechanism outside of the housing 510.

Beneficially, in various embodiments, the flush valve 500 operates on the principle of deflection of a flexible elastomeric diaphragm. In the valve closed position, the sealing load is provided by compression spring 512. This deflection is controlled by the energization and deenergization of a DC motor (e.g., the electric motor 506). Standard available brushed or brushless motors may be used for this use. The motor gear actuation unit is located externally to the drain path. Accordingly, the diaphragm valve performs as an independent component in the drain path. The actuation and the valve units may be easily dismantled to facilitate for easy maintenance. Since the flushing process is vacuum assisted, the diaphragm 320 interfacing with the seating 324 for successive flush valve closing will not be clogged or contaminated. This way, valve sealing cleanliness and the sealing performance is not degraded and is reliable.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flush valve, comprising:
a housing having a first end and a second end;
a piston stem extending between the first end and the second end;
a piston stem fore end coupled to the piston stem, the piston stem fore end positioned toward the second end when in a closed position;
a first O-ring and a second O-ring defining a control chamber therebetween; and
a solenoid valve in fluid communication with the control chamber such that in an energized state, the solenoid valve charges a pressurized gas into the control chamber, pushing the piston stem toward the first end and into an open position.

2. The flush valve of claim 1, wherein, in the closed position, the piston stem fore end is configured to interface with a shaped seating region provided in a drainpipe.

3. The flush valve of claim 1, further comprising a biasing member configured to spring load the piston stem.

4. The flush valve of claim 1, further comprising a diaphragm coupled to the piston stem fore end.

5. The flush valve of claim 4, wherein the diaphragm is a circular shaped flexible elastomeric diaphragm such that in the open position, the diaphragm is deflected by the piston stem movement away from the second end.

6. The flush valve of claim 1, further comprising a manual override unit coupled to the piston stem.

7. The flush valve of claim 6, wherein the manual override unit comprises a leverage unit coupled to a fulcrum fixed to the housing, the leverage unit loaded with a torsion spring to provide a tension.

8. A plumbing system comprising:
a toilet bowl;
a rinse valve coupled to the toilet bowl and configured to open in response to external activation;
a vacuum generator configured to create a differential pressure in the plumbing system to move waste from the toilet bowl to a waste tank; and
a flush valve coupled to the toilet bowl and configured to open in response to the external activation, the flush valve comprising:
a housing having a first end and a second end;
a piston stem extending between the first end and the second end;
a piston stem fore end coupled to the piston stem, the piston stem fore end positioned toward the second end when in a closed position;
a first O-ring and a second O-ring defining a control chamber therebetween; and
a solenoid valve in fluid communication with the control chamber such that in an energized state, the solenoid valve charges a pressurized gas into the control chamber, pushing the piston stem toward the first end and into an open position.

9. The plumbing system of claim 8, wherein, in the closed position, the piston stem fore end is configured to interface with a shaped seating region provided in a drainpipe.

10. The plumbing system of claim 9, wherein, in response to opening the rinse valve, waste water may flow via fluid conduits from a potable water tank to the toilet bowl and waste water is dispensed via the drainpipe from the toilet bowl to the waste tank, such that the flush valve facilitates the waste water to move through the drainpipe in the open position.

11. The flush valve of claim 8, wherein, in the closed position, the piston stem fore end is configured to interface with a shaped seating region provided in a drainpipe.

12. The flush valve of claim 8, further comprising a biasing member configured to spring load the piston stem.

13. The flush valve of claim 9, further comprising a diaphragm coupled to the piston stem fore end.

14. The flush valve of claim 13, wherein the diaphragm is a circular shaped flexible elastomeric diaphragm such that in the open position, the diaphragm is deflected by the piston stem movement away from the drainpipe.

15. The flush valve of claim 8, further comprising a manual override unit coupled to the piston stem.

16. The flush valve of claim 15, wherein the manual override unit comprises a leverage unit coupled to a fulcrum fixed to the housing, the leverage unit loaded with a torsion spring to provide a tension.

17. A flush valve, comprising:
a housing having a first end and a second end;
a piston stem extending between the first end and the second end and comprising a rack;
a piston stem fore end coupled to the piston stem, the piston stem fore end positioned toward the second end when in a closed position; and
a motor in mechanical communication with the piston stem such that the motor is configured to move the piston stem toward the first end and into an open position.

18. The flush valve of claim 17, further comprising a pinion coupled to the motor, the pinion configured to mate with the rack such that the motor is configured to transfer a rotary movement to a linear type via the pinion.

19. The flush valve of claim 17, further comprising:
a biasing member configured to spring load the piston stem;
a diaphragm coupled to the piston stem fore end, wherein the diaphragm is a circular shaped flexible elastomeric diaphragm such that in the open position, the diaphragm is deflected by the piston stem movement away from a drainpipe; and
a manual override unit coupled to the piston stem, wherein the manual override unit comprises a leverage unit coupled to a fulcrum fixed to the housing, the leverage unit loaded with a torsion spring to provide a tension.

* * * * *